(12) United States Patent
McCormick et al.

(10) Patent No.: US 9,878,621 B2
(45) Date of Patent: Jan. 30, 2018

(54) SYSTEM AND METHOD FOR IMPROVED ABS PERFORMANCE DURING PARALLEL REGENERATIVE BRAKING

(71) Applicant: Ford Global Technologies, LLC, Dearborn, MI (US)

(72) Inventors: John Phillip McCormick, Milford, MI (US); Dale Scott Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 104 days.

(21) Appl. No.: 13/708,958

(22) Filed: Dec. 8, 2012

(65) Prior Publication Data
US 2014/0163786 A1  Jun. 12, 2014

(51) Int. Cl.
*B60L 7/18* (2006.01)
*B60L 3/10* (2006.01)
*B60T 8/32* (2006.01)
*B60T 1/10* (2006.01)

(52) U.S. Cl.
CPC ............... *B60L 7/18* (2013.01); *B60L 3/108* (2013.01); *B60T 1/10* (2013.01); *B60L 2240/465* (2013.01); *B60T 8/329* (2013.01); *B60T 2270/602* (2013.01)

(58) Field of Classification Search
CPC ............ B60W 10/08; B60W 10/18; B60W 30/18127; B60L 7/10; B60L 7/18; B60L 3/108; B60L 2240/465; B60T 1/10; B60T 8/329; B60T 2270/602; H02P 3/14

USPC .......... 701/22, 70; 303/3, 15, 138, 150, 151, 303/152

See application file for complete search history.

(56) References Cited

U.S. PATENT DOCUMENTS

| | | | |
|---|---|---|---|
| 5,450,324 A * | 9/1995 | Cikanek | 701/108 |
| 5,472,265 A * | 12/1995 | Ohnuma | 303/3 |
| 5,615,933 A * | 4/1997 | Kidston et al. | 303/152 |
| 5,654,887 A * | 8/1997 | Asa et al. | 701/22 |
| 5,975,656 A * | 11/1999 | Schweikert et al. | 303/132 |
| 6,709,075 B1 * | 3/2004 | Crombez et al. | 303/152 |
| 7,281,770 B1 * | 10/2007 | Curran et al. | 303/151 |
| 7,575,287 B2 * | 8/2009 | Matsuura et al. | 303/152 |
| 8,311,718 B2 * | 11/2012 | Jess et al. | 701/71 |
| 2002/0180266 A1 * | 12/2002 | Hara et al. | 303/152 |
| 2007/0046099 A1 * | 3/2007 | Matsuura et al. | 303/152 |
| 2007/0108838 A1 * | 5/2007 | Shaffer et al. | 303/152 |
| 2008/0100132 A1 * | 5/2008 | Jeon et al. | 303/152 |
| 2010/0117567 A1 * | 5/2010 | Jeon et al. | 318/376 |
| 2011/0060487 A1 * | 3/2011 | Jess et al. | 701/22 |
| 2011/0120787 A1 * | 5/2011 | Lee et al. | 180/65.1 |
| 2011/0130937 A1 * | 6/2011 | Krueger et al. | 701/74 |
| 2011/0196560 A1 * | 8/2011 | Maini et al. | 701/22 |
| 2011/0221265 A1 * | 9/2011 | Busack et al. | 303/152 |
| 2013/0030647 A1 * | 1/2013 | Shimasaki et al. | 701/36 |

(Continued)

*Primary Examiner* — Courtney Heinle
(74) *Attorney, Agent, or Firm* — David Kelley, Esq.; Tung & Associates

(57) ABSTRACT

A system for improved ABS performance during parallel regenerative braking of a vehicle includes an ABS system adapted to transmit an ABS active signal; a drive shaft position sensor adapted to transmit a drive shaft position sensor signal; and a regenerative braking system adapted to inhibit parallel regenerative braking in a primary mode using the ABS signal and in a default mode using the drive shaft position sensor signal.

20 Claims, 3 Drawing Sheets

(56) References Cited

U.S. PATENT DOCUMENTS

| | | |
|---|---|---|
| 2013/0096754 A1* | 4/2013 | Dalum et al. .................... 701/22 |
| 2013/0162009 A1* | 6/2013 | Mitts et al. ........................ 303/3 |
| 2013/0173127 A1* | 7/2013 | Nakatsu et al. ................. 701/70 |
| 2013/0211644 A1* | 8/2013 | Yokoyama et al. ............. 701/22 |
| 2013/0282250 A1* | 10/2013 | Azzi et al. ....................... 701/70 |
| 2013/0289809 A1* | 10/2013 | Treharne et al. ................ 701/22 |
| 2013/0342167 A1* | 12/2013 | Bissontz ........................ 320/118 |

* cited by examiner

SYSTEM AND METHOD FOR IMPROVED ABS PERFORMANCE DURING PARALLEL REGENERATIVE BRAKING

FIELD

Illustrative embodiments of the disclosure generally relate to regenerative braking. More particularly, illustrative embodiments of the disclosure relate to a system and method for improved ABS performance during parallel regenerative braking which uses an ABS active signal as a primary mechanism to inhibit parallel regenerative braking during wheel slip events.

BACKGROUND

To improve fuel economy, hybrid electric vehicles (HEVs) may utilize regenerative (regen) braking, in which kinetic energy is converted by an electric machine into storable energy during braking and then made available for vehicle propulsion. When in parallel regenerative mode, the regen powertrain attempts to detect wheel slip events using a position sensor on the drive shaft and a limited slip control detection algorithm. While sufficient for some road surfaces, this mode of operation is less efficient on other types of surfaces. Utilization of an ABS active signal to inhibit parallel regenerative during wheel slip events may be a more efficient mode of operation for a variety of road surfaces.

Accordingly, a system and method for improved ABS performance during parallel regenerative braking which uses an ABS active signal as a primary mechanism to inhibit parallel regenerative braking during wheel slip events is needed.

SUMMARY

Embodiments of the disclosure are generally directed to a system for improved ABS performance during parallel regenerative braking of a vehicle. An illustrative embodiment of the system includes an ABS system adapted to transmit an ABS active signal; a drive shaft position sensor adapted to transmit a drive shaft position sensor signal; and a regenerative braking system adapted to inhibit parallel regenerative braking in a primary mode using the ABS signal and in a default mode using the drive shaft position sensor signal.

In some embodiments, the system for improved ABS performance during parallel regenerative braking may include a vehicle; a regenerative powertrain coupled and adapted to apply regenerative torque to the vehicle; a drive shaft position sensor interfacing with the regenerative powertrain, the drive shaft position sensor adapted to transmit a drive shaft position sensor signal to the regenerative powertrain during braking of the vehicle; an ABS system interfacing with the regenerative powertrain, the ABS system adapted to transmit an ABS active signal to the regenerative powertrain during braking of the vehicle; and at least one vehicle motion sensor interfacing with the regenerative powertrain, the vehicle motion sensor adapted to transmit a motion sensor signal to the regenerative powertrain during braking of the vehicle. The regenerative powertrain is adapted to utilize the ABS active signal in a primary mode to inhibit parallel regenerative braking, the regenerative powertrain is adapted to utilize the motion sensor signal in a first default mode to inhibit parallel regenerative braking and the regenerative powertrain is adapted to utilize the drive shaft position sensor signal in a second default mode to inhibit parallel regenerative braking during braking of the vehicle.

Embodiments of the disclosure are further generally directed to a method for improved ABS performance during parallel regenerative braking. An illustrative embodiment of the method includes using a signal indicating that ABS is active to inhibit parallel regenerative braking.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
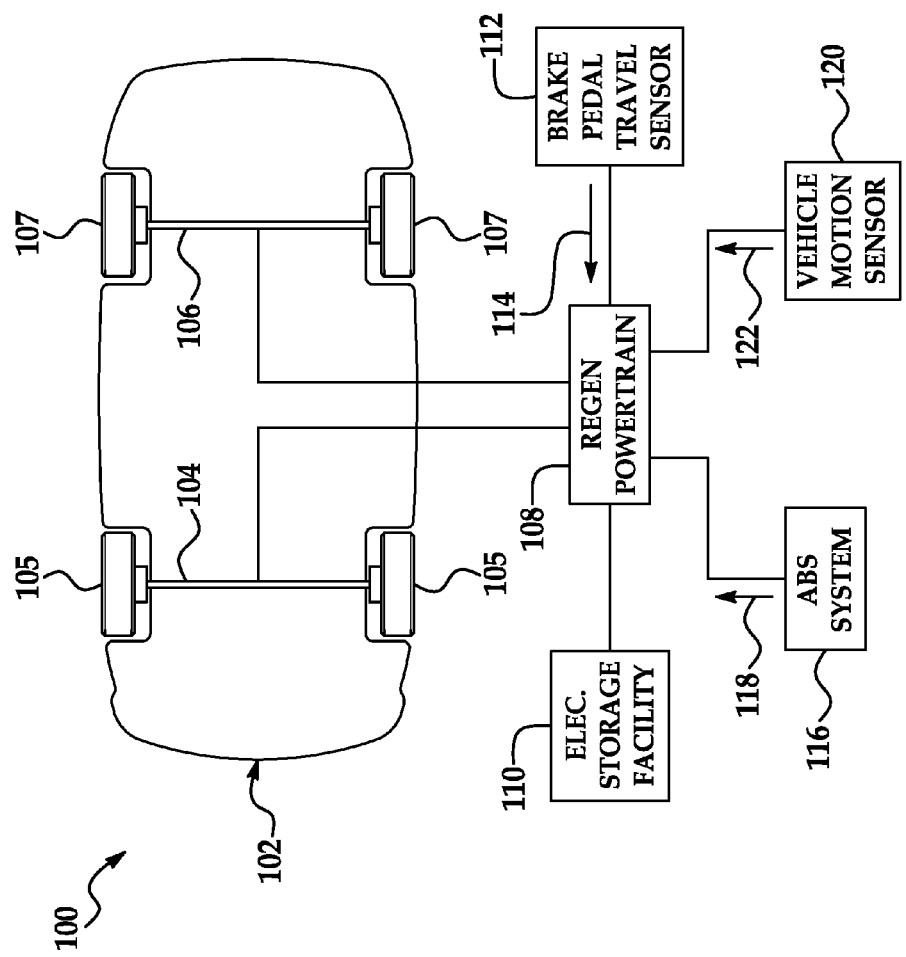
FIG. 1 is a schematic block diagram of an illustrative embodiment of the system for improved ABS performance during parallel regenerative braking.

Referring initially to FIG. 1, an illustrative embodiment of the parallel regenerative brake torque modulation system, hereinafter system, is generally indicated by reference numeral 100. The system 100 may include a vehicle 102. In some embodiments, the vehicle 102 may include a hybrid electric vehicle (HEV) or a plug-in hybrid electric vehicle (PHEV), for example and without limitation. The vehicle 102 may have a front axle 104 with a pair of front wheels 105 and a rear axle 106 with a pair of rear wheels 107.

A regenerative powertrain 108 may interface with at least one of the front axle 104 and the rear axle 106 of the vehicle 102. In some embodiments, the regenerative powertrain 108 may interface with one or more front wheels 105 and/or one or more rear wheels 107 of the vehicle 102. The regenerative powertrain 108 may be adapted to apply regenerative torque to the front axle 104 and/or the rear axle 106 during braking of the vehicle 102, typically in the conventional manner. The regenerative powertrain 108 may be adapted to convert mechanical power from the rotating front axle 104 and/or rear axle 106 into electrical power. The electrical power may be stored in a battery or other suitable electrical storage facility 110 which electrically interfaces with the regenerative powertrain 108. The electrical power which is stored in the electrical storage facility 110 may be used in propulsion of the vehicle 102 such as in the conventional manner.

A drive shaft position sensor 112 may interface with the regenerative powertrain 108. The drive shaft position sensor 112 may be provided on a draft shaft (not illustrated) of the vehicle 102. During operation of the vehicle 102, the drive shaft position sensor 112 may be adapted to detect wheel slip events of the front wheels 105 and/or the rear wheels 107 of the vehicle 102 using a limited slip control detection algorithm such as in the conventional manner. The drive shaft position sensor 112 may be further adapted to transmit a drive shaft position sensor signal 114 which indicates the wheel slip events to the regenerative powertrain 108.

An ABS (Antilock Brake) system 116 of the vehicle 102 may interface with the regenerative powertrain 108. The ABS system 116 may be adapted to transmit an ABS active signal 118 to the regenerative powertrain 108 during braking of the vehicle 102. The ABS active signal 118 may be transmitted from the ABS system 116 to the regen powertrain 108 via a CAN (controller area network). In some embodiments, at least one vehicle motion sensor 120 may interface with the regenerative powertrain 108. The vehicle motion sensor 120 may include at least one wheel speed sensor and/or at least one acceleration sensor (such as a longitudinal acceleration sensor, a lateral acceleration sensor, etc.), for example and without limitation. The vehicle motion sensor 120 may be adapted to transmit a motion sensor signal 122 to the regenerative powertrain 108.

In exemplary application of the system 100, the regenerative powertrain 108 applies torque to the front axle 104 and/or the rear axle 106 during braking of the vehicle 102. The regenerative powertrain 108 generates electrical power which may be stored in the electrical storage facility 110 and may be used in propulsion of the vehicle 102. Depending on the type of surface on which the vehicle 102 is traveling, the ABS system 116 may be engaged during braking of the vehicle 102 to ensure optimal braking of the vehicle 102 on the surface. Upon engagement, the ABS system 116 transmits the ABS active signal 118 to the regenerative powertrain 108.

In the event that the regenerative powertrain 108 receives an ABS active signal 118 from the ABS system 116 during braking of the vehicle 102, the regenerative powertrain 108 may use the ABS active signal 118 to inhibit parallel regenerative braking of the vehicle 102. In some embodiments, in the event that the regenerative powertrain 108 does not receive an active ABS active signal 118 from the ABS system 116 during vehicle braking, the regenerative powertrain 108 may instead utilize a powertrain slip control detection which is transmitted from the drive shaft position sensor 112 via the drive shaft position sensor signal 114 to inhibit parallel regenerative braking. Therefore, in a primary mode, the regenerative powertrain 108 may utilize the ABS active signal 118 from the ABS system 116 to inhibit parallel regenerative braking of the vehicle 102. In a default mode, the regenerative powertrain 108 may utilize the drive shaft position sensor signal 114 from the drive shaft position sensor 112 to inhibit parallel regenerative braking during braking of the vehicle 102.

In some embodiments of the system 100, in the event that the regenerative powertrain 108 does not receive an ABS active signal 118 from the ABS system 116 during vehicle braking, the regenerative powertrain 108 may use a motion sensor-based powertrain slip control detection which is transmitted from the vehicle motion sensor 120 via the motion sensor signal 122 to inhibit the parallel regenerative braking of the vehicle 102. In the event that neither the ABS active signal 118 nor the motion sensor signal 122 is available, the regenerative powertrain 108 may use a powertrain slip control detection which is transmitted from the drive shaft position sensor 112 via the drive shaft position sensor signal 114 to inhibit parallel regenerative braking. Therefore, the regenerative powertrain 108 may utilize the ABS active signal 118 from the ABS system 116 in a primary mode to inhibit parallel regenerative braking of the vehicle 102 during vehicle braking. The regenerative powertrain 108 may utilize the motion sensor signal 122 from the vehicle motion sensor 120 in a first default mode and the drive shaft position sensor signal 114 from the drive shaft position sensor 112 in a second default mode to inhibit parallel regenerative braking during braking of the vehicle 102.

Figure 2:
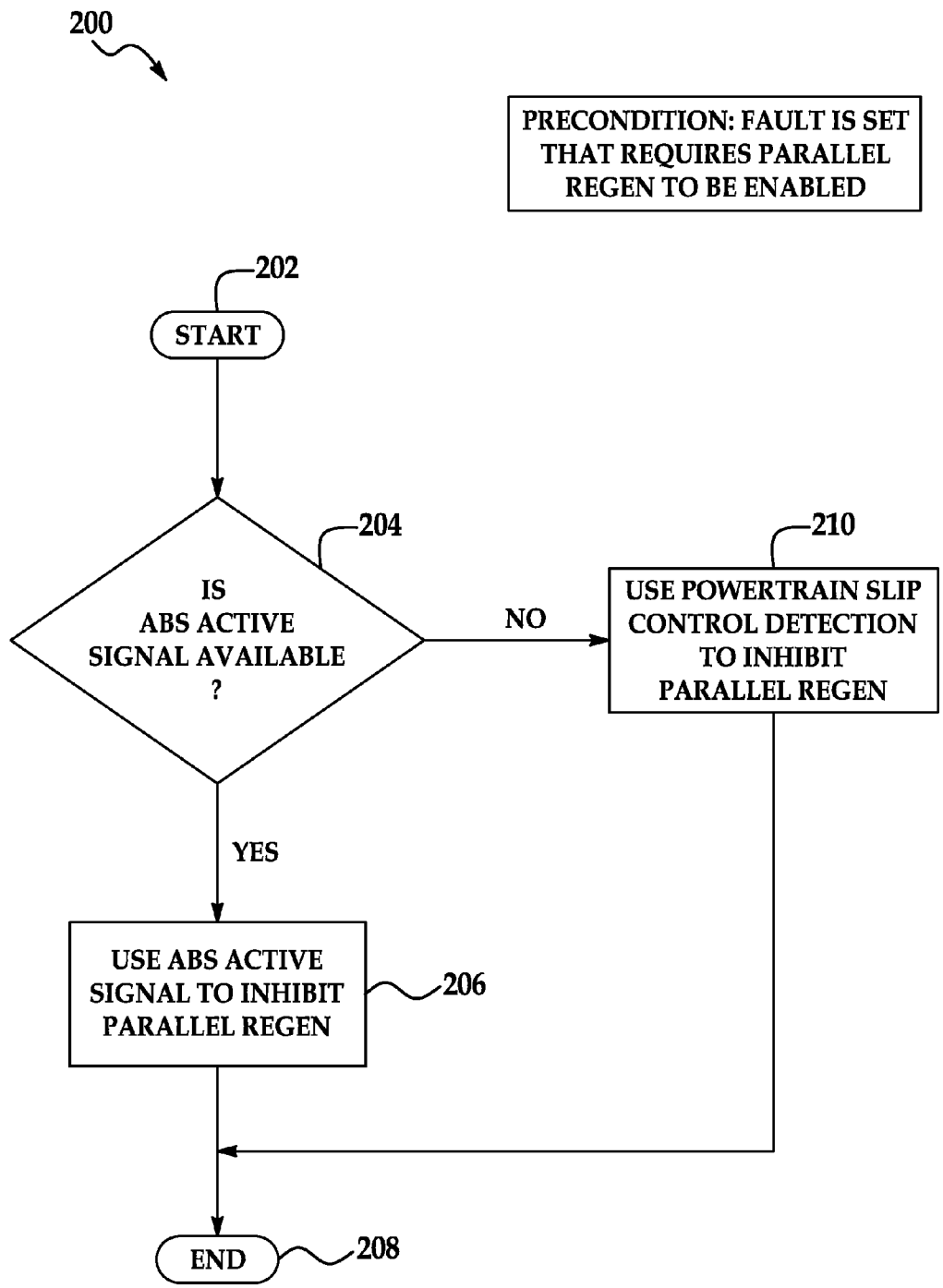
FIG. 2 is a block diagram of an illustrative embodiment of the method for improved ABS performance during parallel regenerative braking.

Referring next to FIG. 2 of the drawings, a block diagram 200 of an illustrative embodiment of a method for improved ABS performance during parallel regenerative braking is shown. In some embodiments, a fault may be set which requires that parallel regenerative braking of a vehicle be enabled. The method 200 begins at block 202. In block 204, a determination may be made as to whether an ABS active signal is available. If an ABS active signal is available, then in block 206 the ABS active signal may be used to inhibit parallel regenerative braking of the vehicle and the method may end at block 208. If an ABS active signal is not available in block 204, then in block 210 a powertrain slip control detection may be used to inhibit parallel regenerative braking of the vehicle and the method may end at block 208.

Figure 3:
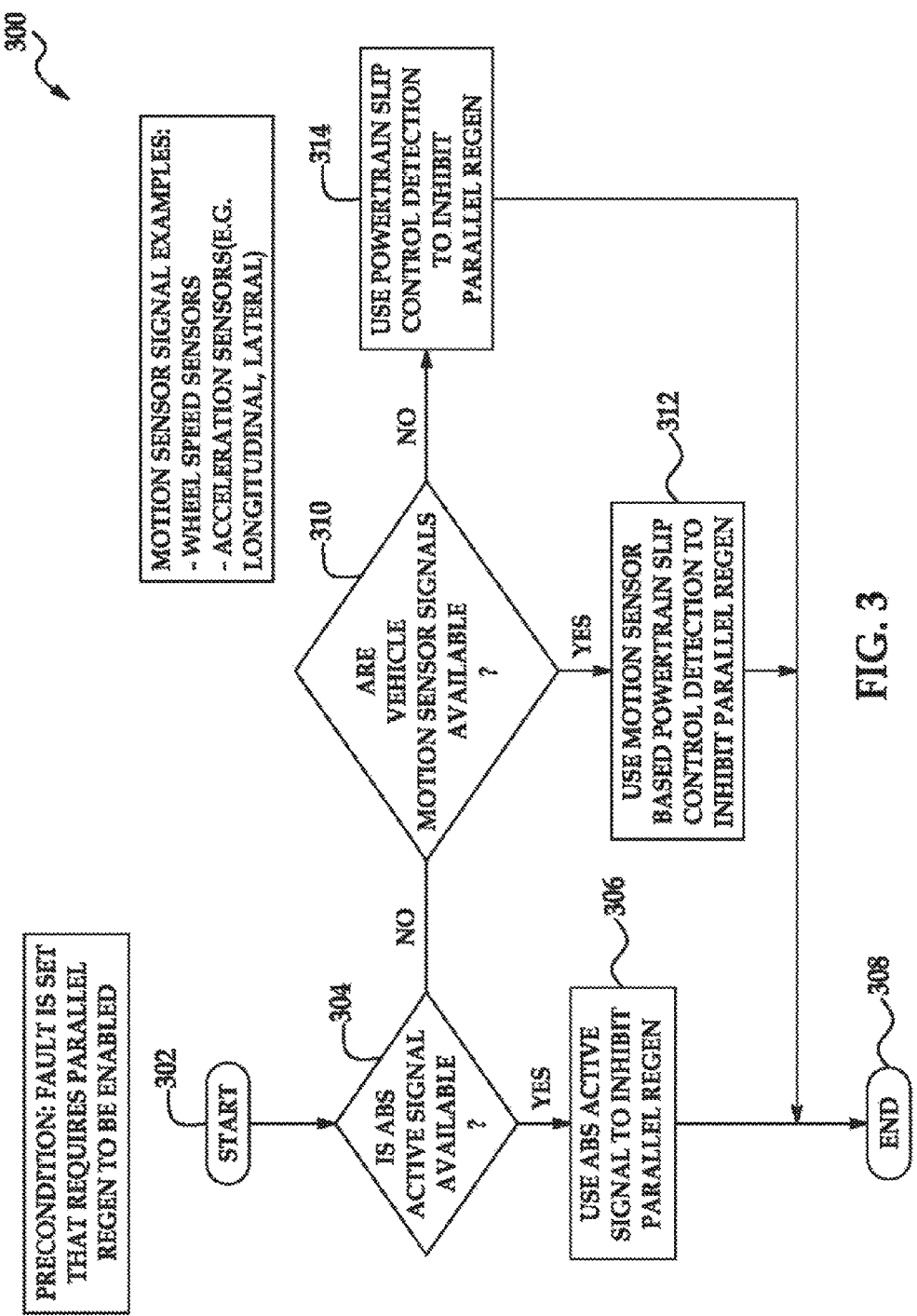
FIG. 3 is a block diagram of an alternative illustrative embodiment of the method for improved ABS performance during parallel regenerative braking.

Referring next to FIG. 3 of the drawings, a block diagram 300 of an alternative illustrative embodiment of the method for improved ABS performance during parallel regenerative braking is shown. In some embodiments, a fault may be set which requires that parallel regenerative of a vehicle be enabled. The method 300 begins at block 302. In block 304, a determination may be made as to whether an ABS active signal is available. If an ABS active signal is available, then in block 306 the ABS active signal may be used to inhibit parallel regenerative braking of the vehicle and the method may end at block 308. If an ABS active signal is not available in block 304, then in block 310 a determination may be made as to whether vehicle motion sensor signals are available. If vehicle motion sensor signals are available, then in block 312 a motion sensor-based powertrain slip control detection may be used to inhibit parallel regenerative braking of the vehicle. If vehicle motion sensor signals are not available in block 310, then in block 314 a powertrain slip control detection may be used to inhibit parallel regenerative braking of the vehicle and the method may end at block 308.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A system for improved ABS system (Antilock Braking) performance during parallel regenerative braking, comprising:
   a vehicle;
   a regenerative powertrain comprising a controller and associated memory storing computer program instructions, the controller comprising a processor configured to execute the computer program instructions, the regenerative powertrain configured to apply regenerative torque to the vehicle;

a drive shaft position sensor interfacing with the regenerative powertrain, the drive shaft position sensor configured to detect a wheel slip condition and in response to said detection transmit a drive shaft position sensor signal to the regenerative powertrain during braking of the vehicle;

an ABS system interfacing with the regenerative powertrain, the ABS system configured to transmit an ABS active signal to the regenerative powertrain during said braking of the vehicle;

at least one vehicle motion sensor interfacing with the regenerative powertrain, the vehicle motion sensor configured to detect vehicle motion indicative of a wheel slip condition and in response to said detection transmit a motion sensor signal to the regenerative powertrain during said braking of the vehicle; and wherein the regenerative powertrain controller is configured to utilize the ABS active signal to at least partially inhibit parallel regenerative braking during said braking of the vehicle, said ABS active signal a primary mode of inhibiting regenerative braking during braking, said ABS active signal used to at least partially inhibit said parallel regenerative braking when the motion sensor signal and the drive shaft position sensor signal is unavailable, the at least one vehicle motion sensor signal, the drive shaft position sensor signal, and the ABS active signal separately interfacing with the regenerative powertrain, parallel regenerative braking of the vehicle being enabled in the regenerative powertrain as a precondition to evaluation of said separately interfacing signals, the regenerative powertrain controller is further configured to utilize the motion sensor signal when the ABS active signal and the drive shaft position sensor signal are unavailable in a first default mode, the first default mode operative only when said ABS active signal is determined to be unavailable during said braking, the first default mode configured to at least partially inhibit parallel regenerative braking during said braking and during said wheel slip condition of the vehicle, and the regenerative powertrain controller is further configured to utilize the drive shaft position sensor signal when the ABS active signal and the motion sensor signal are unavailable in a second default mode to at least partially inhibit parallel regenerative braking during said braking and during said wheel slip condition of the vehicle, said second default mode operative only when said ABS active signal and said motion sensor signal are determined to be unavailable during said braking.

2. The system of claim 1 wherein the vehicle comprises a hybrid electric vehicle.

3. The system of claim 1 wherein the vehicle comprises a plug-in hybrid electric vehicle.

4. The system of claim 1 further comprising an electrical storage facility electrically interfacing with the regenerative powertrain.

5. The system of claim 1 wherein the vehicle comprises a front axle with front wheels and a rear axle with rear wheels, and the regenerative powertrain is configured to apply regenerative torque to at least one of the front axle and the rear axle.

6. The system of claim 1 wherein the vehicle comprises a front axle with front wheels and a rear axle with rear wheels, and the regenerative powertrain is configured to apply regenerative torque to a selected one of the front wheels and the rear wheels.

7. The system of claim 1 wherein the at least one vehicle motion sensor comprises a plurality of vehicle motion sensors.

8. The system of claim 1 wherein the at least one vehicle motion sensor comprises at least one wheel speed sensor.

9. The system of claim 1 wherein the at least one vehicle motion sensor comprises at least one acceleration sensor.

10. A computer-implemented method for improved ABS system (Antilock Braking) performance during parallel regenerative braking, comprising:

determining availability of an ABS active signal during braking of a vehicle by one or more controllers, said ABS active signal transmitted to a regenerative powertrain during said braking of the vehicle; and wherein said one or more controllers at least partially inhibit parallel regenerative braking during said braking of a vehicle when said ABS active signal is determined by said one or more controllers to be available during said braking, the ABS active signal transmitted to the regenerative powertrain instead of a drive shaft position sensor signal, the ABS active signal and the drive shaft position sensor signal separately interfacing with the regenerative powertrain, parallel regenerative braking of the vehicle being enabled as a precondition to the one or more controllers evaluating said separately interfacing signals; and using powertrain slip control detection comprising detection of a wheel slip condition based on the drive shaft position sensor signal, said drive shaft position sensor signal transmitted to the regenerative powertrain during braking of the vehicle, said drive shaft position sensor signal used instead of said ABS active signal to at least partially inhibit said parallel regenerative of the vehicle during said braking and during said wheel slip condition only if said ABS active signal is determined by said one or more controllers to be not available.

11. The method of claim 10 further comprising;
said one or more controllers determining availability of the drive shaft position sensor signal.

12. The method of claim 10 further comprising said one or more controllers determining availability of the vehicle motion sensor signal and using the powertrain slip control detection based on the vehicle motion sensor signal instead of the ABS active signal and the drive shaft position sensor signal to at least partially inhibit parallel regenerative braking of the vehicle, the powertrain slip control detection used only if the ABS active signal and the drive shaft position sensor signal are determined by said one or more controllers to be not available, the ABS active signal and the vehicle motion sensor signal separately interfacing with the regenerative powertrain.

13. The method of claim 12 wherein the determining availability of the motion sensor signal comprises determining availability of a motion sensor signal transmitted by at least one wheel speed sensor.

14. The method of claim 12 wherein the determining availability of the motion sensor signal comprises determining availability of a motion sensor signal transmitted by at least one acceleration sensor.

15. A system for improved ABS system (Antilock Braking) performance during parallel regenerative braking of a vehicle, comprising:
a vehicle;
a regenerative powertrain comprising a controller and associated memory storing computer program instructions, the controller comprising a processor configured to execute the computer program instructions, the regenerative powertrain configured to apply regenerative torque to the vehicle;

a drive shaft position sensor interfacing with the regenerative powertrain, the drive shaft position sensor configured to detect a wheel slip condition and in response to said detection transmit a drive shaft position sensor signal to the regenerative powertrain during braking of the vehicle;

an ABS system interfacing with the regenerative powertrain, the ABS system configured to transmit an ABS active signal to the regenerative powertrain during braking of the vehicle; and wherein the regenerative powertrain controller is configured to utilize the ABS active signal instead of the drive shaft position sensor signal in a primary mode to at least partially inhibit parallel regenerative braking if the ABS active signal is determined to be available during braking of the vehicle, the ABS active signal and the drive shaft position sensor signal separately interfacing with the regenerative powertrain, parallel regenerative braking of the vehicle being enabled in the regenerative powertrain as a precondition to evaluating said separately interfacing signals; and wherein the regenerative powertrain controller is further configured to utilize the drive shaft position sensor signal instead of the ABS active signal in a default mode to at least partially inhibit said parallel regenerative braking during said braking and during said wheel slip condition of the vehicle, the default mode operative only when the ABS active signal is determined to be unavailable during said braking.

16. The system of claim 15 wherein the vehicle comprises a hybrid electric vehicle.

17. The system of claim 15 wherein the vehicle comprises a plug-in hybrid electric vehicle.

18. The system of claim 15 further comprising an electrical storage facility electrically interfacing with the regenerative powertrain.

19. The system of claim 15 wherein the vehicle comprises a front axle with front wheels and a rear axle with rear wheels, and the regenerative powertrain is configured to apply regenerative torque to at least one of the front axle and the rear axle.

20. The system of claim 15 wherein the vehicle comprises a front axle with front wheels and a rear axle with rear wheels, and the regenerative powertrain is configured to apply regenerative torque to a selected one of the front wheels and the rear wheels.

* * * * *